US009902233B2

(12) United States Patent (10) Patent No.: US 9,902,233 B2
Thompson et al. (45) Date of Patent: Feb. 27, 2018

(54) ROOF FOR A WORK VEHICLE

(71) Applicant: Deere & Company, Moline, IL (US)

(72) Inventors: Michael Thompson, Bettendorf, IA (US); Benjamin J. Jordan, Davenport, IA (US); Trent Kulig, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/746,998

(22) Filed: Jun. 23, 2015

(65) Prior Publication Data

US 2016/0375941 A1 Dec. 29, 2016

(51) Int. Cl.
*B60H 1/00* (2006.01)
*B60H 1/24* (2006.01)
*B62D 33/06* (2006.01)
*B62D 25/06* (2006.01)
*B60H 1/26* (2006.01)
*B62D 29/04* (2006.01)

(52) U.S. Cl.
CPC ..... *B60H 1/00378* (2013.01); *B60H 1/00564* (2013.01); *B60H 1/245* (2013.01); *B60H 1/246* (2013.01); *B60H 1/262* (2013.01); *B62D 25/06* (2013.01); *B62D 29/043* (2013.01); *B62D 33/0617* (2013.01); *B60H 2001/00221* (2013.01); *B60H 2001/00228* (2013.01); *B60H 2001/00235* (2013.01); *B60Y 2200/22* (2013.01)

(58) Field of Classification Search
CPC ............ B60H 1/00357; B60H 1/00378; B60H 1/00507; B60H 1/0055; B60H 1/00557; B60H 1/00564; B60H 1/245; B60H 1/262; B62D 33/0617

USPC .............................. 296/190.01, 190.09, 212
See application file for complete search history.

(56) References Cited

U.S. PATENT DOCUMENTS

| | | | | |
|---|---|---|---|---|
| 6,309,012 B1 * | 10/2001 | Fryk | .................. | B60H 1/00378 296/102 |
| 6,398,294 B1 * | 6/2002 | Bollweg | ............ | B60H 1/00378 296/190.09 |
| 7,334,834 B2 * | 2/2008 | Hill | .................... | B60H 1/00378 296/190.09 |
| 7,399,221 B2 * | 7/2008 | Masumoto | ......... | B60H 1/00378 244/118.5 |
| 8,056,963 B2 * | 11/2011 | Bruss | ................. | B60H 1/00378 296/190.09 |
| 8,485,589 B2 * | 7/2013 | Obe | .................... | B60H 1/00378 296/190.09 |

(Continued)

FOREIGN PATENT DOCUMENTS

DE 10362300 B4 * 6/2013 ......... B60R 13/0212
FR 2737697 2/1997

OTHER PUBLICATIONS

European search report for Application No. 16171870.5 dated Nov. 23, 2016.

*Primary Examiner* — Jason S Daniels
(74) *Attorney, Agent, or Firm* — Rathe Lindenbaum LLP

(57) ABSTRACT

A roof (102) for work vehicle comprises a molded roof portion (200) formed by rotational molding, the molded roof portion (200) having a first surface (202) that is generally planar and faces upward, and a second surface (300) molded integral with the first surface (202), wherein the second surface (300) faces downward and has a plurality of integrally molded troughs (308, 310) that extend upward into the second surface (300).

20 Claims, 5 Drawing Sheets

(56) References Cited

U.S. PATENT DOCUMENTS

| | | | | |
|---|---|---|---|---|
| 8,528,965 B2* | 9/2013 | Nagami | ............. | B60H 1/00378 |
| | | | | 296/190.09 |
| 2001/0011834 A1* | 8/2001 | Boyce | .................... | B60H 1/247 |
| | | | | 296/190.09 |
| 2007/0205633 A1* | 9/2007 | Waco | ................. | B60H 1/00378 |
| | | | | 296/190.09 |
| 2015/0298749 A1* | 10/2015 | Zurinski | ............ | B62D 33/0617 |
| | | | | 296/190.08 |

* cited by examiner

ROOF FOR A WORK VEHICLE

FIELD OF THE INVENTION

The invention relates to work vehicles, such as construction or agricultural vehicles. More particularly it relates to operator stations for work vehicles. Even more particularly, it relates to molded roofs for the operator stations.

BACKGROUND OF THE INVENTION

In recent years, roofs for operator stations for work vehicles such as tractors, combines, road graders, and the like, are typically made out of molded plastic. Molded plastic is particularly suited to forming such roofs because it is lightweight, inexpensive, and can be formed into many complex shapes. In addition to the outer roof shape and the inner shape, other features have been molded into the roof, such as metal fittings, internal passageways and the like.

In a typical arrangement, the roof is rotationally molded ("rotomolded") in a mold cavity. This mold cavity simultaneously defines and forms the outer and upper surface of the roof (i.e. the surface facing the elements) and the inner and lower surface of the roof. The inner and lower surface of the roof faces downward toward the operator.

In some prior art systems, air conduits have been attached to the inside surface of the roof. These air conduits, however, are relatively expensive to fabricate and difficult to attach and assemble. What is needed is a roof for a work vehicle with conduits that is easier and less expensive to construct.

SUMMARY OF THE INVENTION

In accordance with one aspect of the invention, a roof for an operator station of a work vehicle comprises a molded roof portion formed by rotational molding, the molded roof portion having a first surface that is generally planar and faces in a first direction, and a second surface molded integral with the first surface, wherein the second surface faces in a second direction opposite the first direction and has a plurality of integrally molded troughs that extend upward into the second surface; and a cover that is fixed to the second surface and encloses the plurality of integrally molded troughs, thereby forming a plurality of air conduits between the plurality of integrally molded troughs and the cover.

The plurality of air conduits may define at least one air inlet configured to receive air from an air conditioning unit, and may further define a plurality of air outlets configured to release air from the plurality of air conduits into the operator station.

The plurality of air outlets may be formed as holes in the cover.

The at least one air inlet may be formed as an aperture in the cover.

The plurality of integrally molded troughs may be formed as a central trough from which several branching troughs extend.

The branching troughs may extend both forward from the central trough, and may fan out laterally.

The branching troughs may narrow in a horizontal direction as they extend forward from the central trough.

The plurality of integrally molded troughs may comprise a floor, and two sidewalls integrally molded with the floor, and further wherein the two sidewalls flare outward from each other as they extend away from the floor.

The roof may further comprise a headliner fixed to the molded roof portion, wherein the headliner may enclose the cover between the molded roof portion and the headliner.

DETAILED DESCRIPTION

Figure 1:
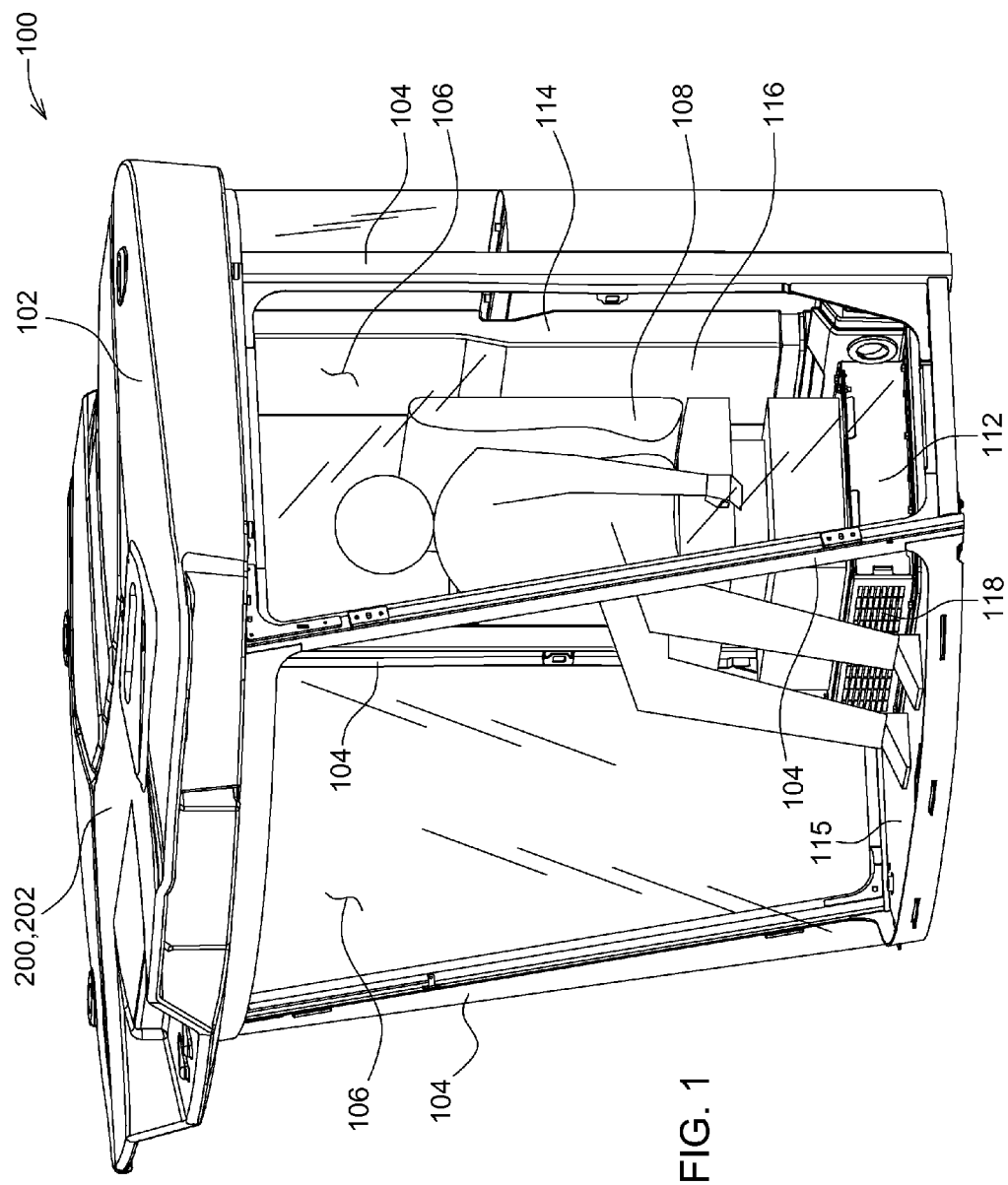
FIG. 1 is a perspective view of an operator station of a work vehicle having a roof in accordance with the present invention.

Referring to FIG. 1, an operator station 100 for a work vehicle is shown. The operator station 100 includes a roof 102, vertical supports 104, windows 106, an operator seat 108, air conditioning unit 112, and a rear vertical conduit 114.

The operator station is completely enclosed in the arrangement shown herein. It has a floor 115 from which several vertical supports 104 extend upward. Between the vertical supports are windows 106 which provide a view to the front, both sides, and the rear of the vehicle. The operator seat 108 faces forward so the operator can view vehicle operations through the windshield (the front facing window 106). A door 116 is provided in which one of the windows 106 is disposed to provide the operator with a left side view of vehicle operations.

The air conditioning unit 112 is disposed underneath the operator seat 108 where it will not block the operator's view. Air inlets 118 are provided in a front-facing surface of the air conditioning unit 112 to receive air from within the cab. The air conditioning unit 112 is configured to condition the air (heating, cooling, or both) and to force the air upward through the rear vertical conduit 114.

The rear vertical conduit 114 is coupled to the roof 102. The roof 102 receives air transmitted upward through the rear vertical conduit 114. The roof 102 distributes the air laterally and forwardly through internal conduits in the roof 102, whereupon the air exits through downwardly facing air directors at the terminus of those conduits. The air exits into the operator station, thereby providing the operator with a continuous source of conditioned air.

The roof 102 has molded roof portion 200, formed by rotational molding. The molded roof portion 200 has a first surface 202 that is an outer and upwardly facing surface. The first surface 202 is exposed to the elements, and is integrally formed as part of the rotational molding process. There may be passages that extend through the first surface 202 to accommodate the heads of fasteners, antennas, and the like, but the first surface 202 is generally slightly convex, planar, and otherwise continuous over substantially its entire length and width.

Figure 2:
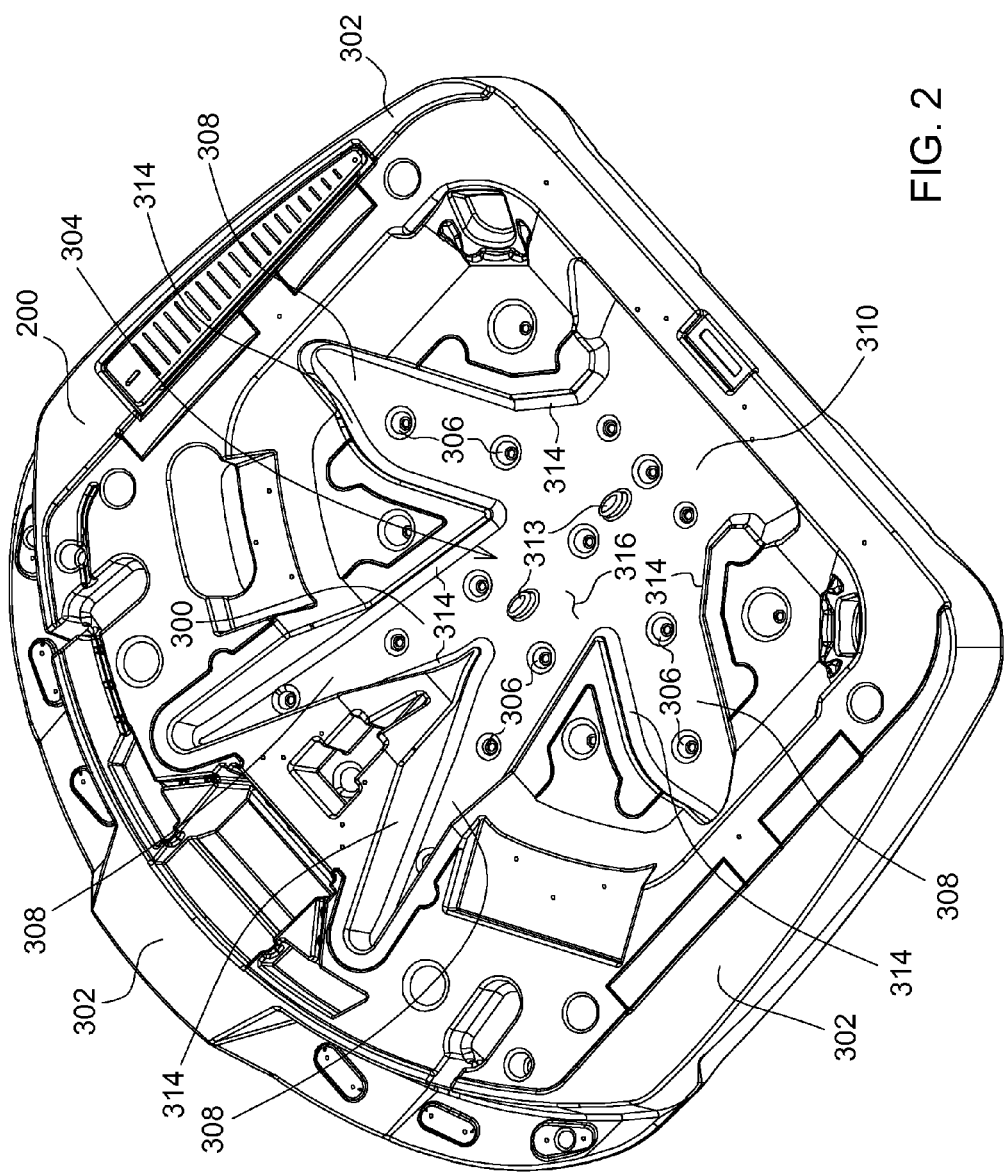
FIG. 2 is a perspective view of the outer molded roof portion of the roof as viewed from underneath.

Referring to FIG. 2 (which shows the underside of molded roof portion 200), the molded roof portion 200 has a second surface 300 that faces downwardly and, like the first surface 202, is generally planar and horizontal. The second surface 300, however, is generally concave, rising upward (when considered in its normal downwardly facing orientation) from its outer edges 302 to a central region 304.

The second surface 300 and the first surface 202 are formed integrally as a part of the rotational molding process. This process spaces the first surface 202 and the second surface 300 apart and provides a void between the two surfaces. To provide additional strength for the roof, over 30 generally conical struts 306 are integrally molded as part of the second surface 300 and the first surface 202. The conical struts 306 extend upward to the first surface 202 to which they are integrally molded.

The second surface 300 defines and forms troughs 308 that extend both forwardly and laterally from the rear of the molded roof portion 200. The troughs 308 are formed integrally with the rest of the second surface 300 as part of the rotational molding process. The troughs 308 are joined together at their rearmost ends to form a larger, central air trough 310.

Each of the troughs 308 is joined to and extends forward from the large central air trough 310, and spreads out laterally much as human fingers branch and spread out from a human palm. In this manner, air introduced into the central air trough 310 is distributed forward and laterally outward into each of the troughs 308.

The troughs 308 get progressively narrower (in a horizontal direction) as they extend forwardly and laterally outward, like splayed human fingers.

The troughs 308 and the central air trough 310 are comprised of a generally flat or slightly curved floor 316 and two sidewalls 314. The two sidewalls 314 flare outward, away from each other as they extend from the first surface 202 to the second surface 300. The sidewalls 314 are formed such that they flare outward at an angle of between 35° and 85° with respect to the adjacent planar surfaces of the second surface 300.

The troughs 308 gradually narrow in their cross-sectional area as each trough extends forward from its origin at the central air trough 310 to its terminus.

Figure 3:
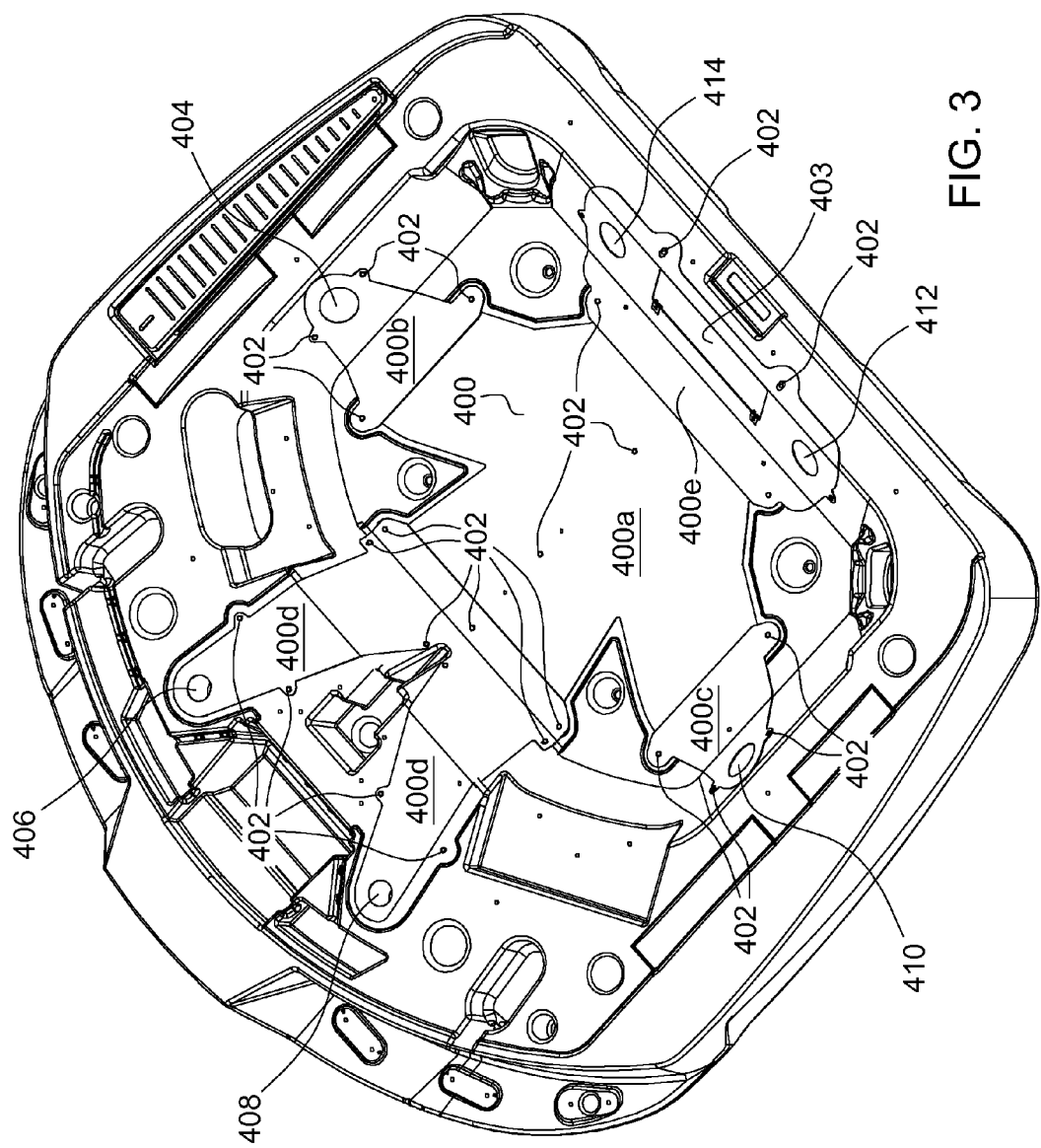
FIG. 3 is a perspective view of the outer molded roof portion with an enclosing cover that together with the molded roof portion forms a roof with conduits.

In the arrangement of FIG. 3, a cover 400 encloses the central air trough 310 and the troughs 308. The cover 400, together with the troughs 308 and the central air trough 310, form enclosed branching air conduits for conducting air from vertical conduit 114 to several air outlets arrayed across the front of the roof 102. The cover 400 is generally flat with a few shallow bends to accommodate the convexity of the second surface 300. The cover 400 may be metal or plastic. If metal, the cover 400 is preferably made of a light metal such as an aluminum alloy. Since the troughs 308 and the central air trough 310 extend into the second surface 300, and since the second surface 300 is generally flat, it is easy to provide a single cover 400 that extends across several adjacent troughs 308 and simultaneously forms an enclosing surface for several or all of the troughs 308 and the central air trough 310. The cover 400 defines a generally rectangular aperture 403 formed at its rear edge that is coupled to the open upper end of the rear vertical conduit 114. In this manner, air that is conditioned in the air conditioning unit 112 flows upward through the rear vertical conduit 114 and into the branching air conduits defined by the troughs 308, the trough 310, and the cover 400.

The cover 400 covers both the central air trough 310 and the troughs 308. A single cover 400 may be used to cover all of the troughs 308 and the central air trough 310. A single cover can enclose multiple conduits, thereby reducing assembly time and manufacturing costs. Alternatively, however, and as illustrated in FIG. 3, cover 400 may be comprised of several individual covers 400a, 400b, 400c, 400d, 400e which are fixed in overlapping fashion to troughs 308 and central air trough 310. The cover 400 is attached to the second surface 300 with fasteners 402. Fasteners 402 may be threaded fasteners, snap fasteners, panel fasteners, rivets, or the like.

Holes 404, 406, 408, 410, 412 and 414 extend through the cover 400 and function as air outlets that permit air to exit the cover 400 and flow downward into the operator station 100. These through holes are circular to fit the circular air directors that abut each of the through holes. In other arrangements, the holes may be oval, elongate, rectangular, etc.

Figure 4:
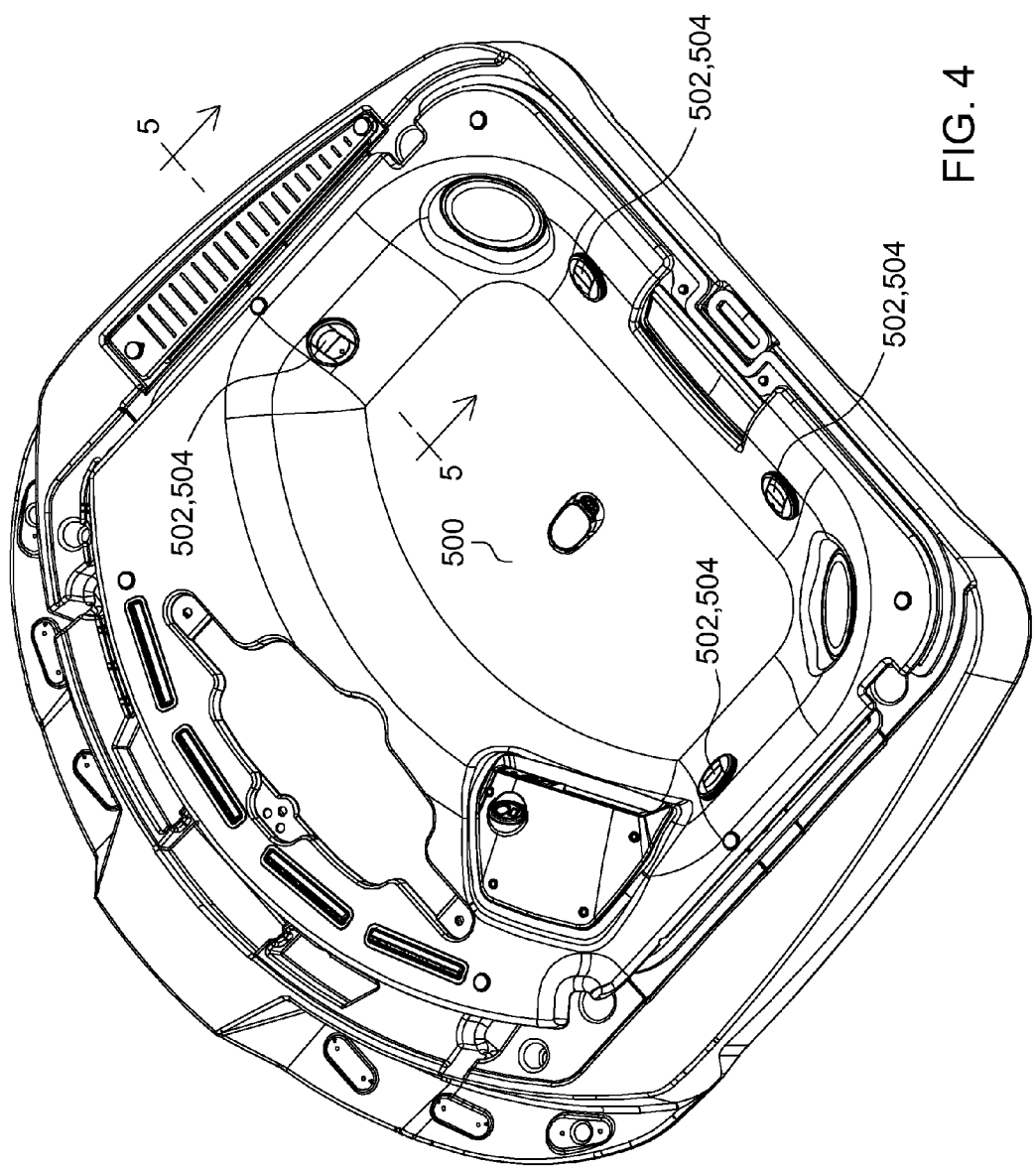
FIG. 4 is a perspective view of the arrangement of FIG. 3 with a headliner and air directors attached.
Figure 5:
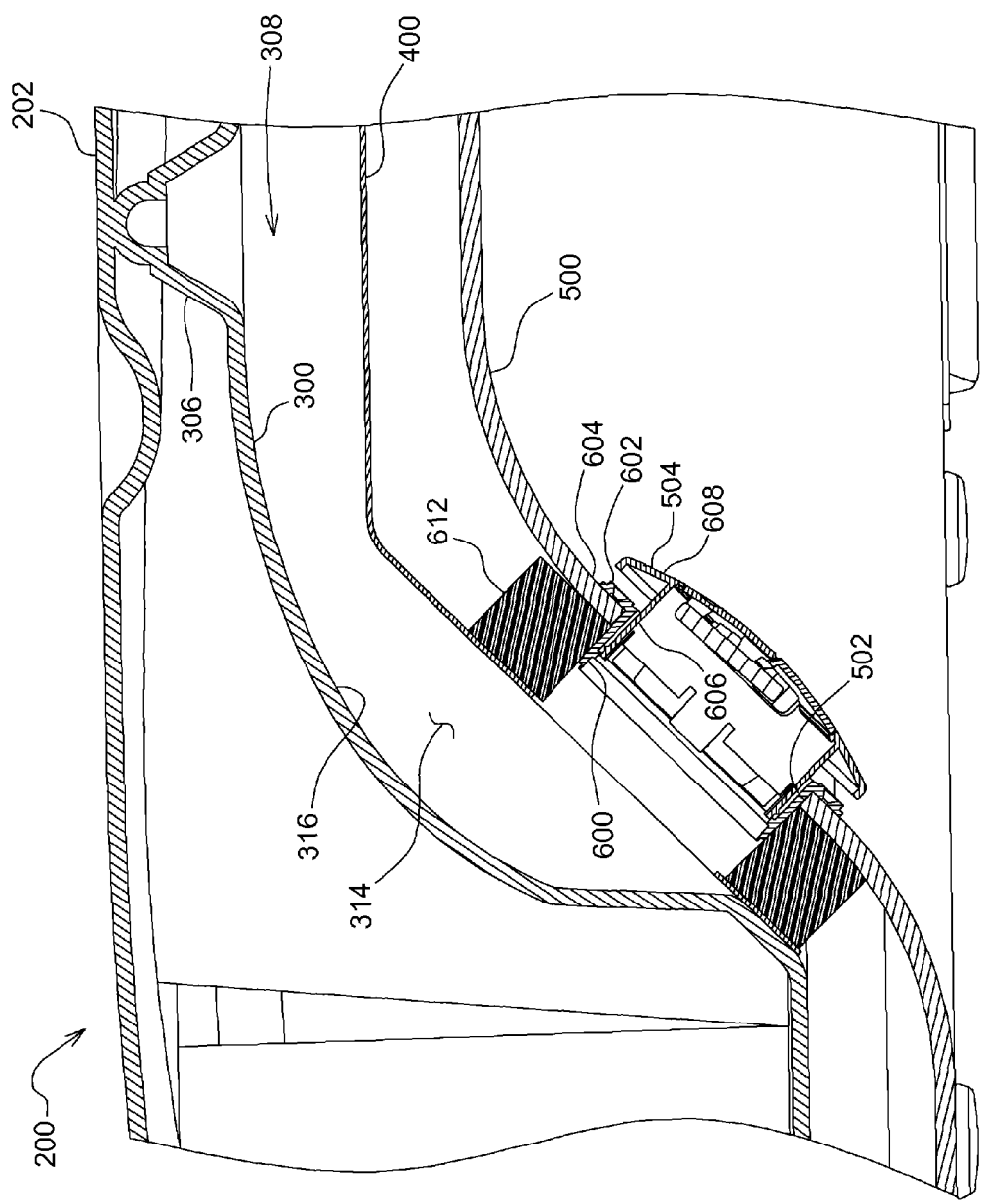
FIG. 5 is a cross-sectional view of the arrangement of FIG. 4 taken at section line 5-5 in FIG. 4 showing the arrangement of the air directors, the headliner, the air seal, the cover, and the molded roof portion in cross-section.

FIG. 5 shows the arrangement of FIG. 4 with the addition of a headliner 500 that is fixed to the second surface 300 on top of the second surface 300 and the cover 400, covering them both. The headliner 500 is substantially the same size as the interior of the second surface 300 (i.e. that portion of the second surface 300 that is within the operator station 100 itself. The headliner 500 has holes 502 configured to receive and support air directors 504. The air directors 504 are generally circular. They are inserted into holes 502.

The headliner 500, like the molded roof portion 200, is made of plastic. For that reason, it can be provided with eye pleasing contours at relatively low cost. The headliner 500 covers the unsightly and irregular contours of second surface 300 and cover 400 thereby providing more gracious curves and contours for the sealing of the operator station 100. A void is provided between second surface 300 and cover 400 and the inner surface of the headliner 500.

FIG. 5 illustrates the way the air directors 504 are received into the holes 502 of the headliner 500. The air directors 504 have a generally circular cylindrical body 600 that is received into the holes 502. A first flange 602 is formed integrally with the cylindrical body 600. The first flange 602 defines a generally circular and planar surface that abuts an outer surface portion 604 of the headliner 500. The air director 504 further comprises a similar circular cylindrical body 606 that is received inside the cylindrical body 600. A second flange 608 is formed integral with and extends outward from the cylindrical body 606. The cylindrical body 606 is enclosed at its lower end by adjustable vents 610 (here shown in their closed position) that can open and close to permit or block airflow through the air director 504. Vanes of the vent can be positioned to direct air leaving the air director 504 in different directions. Further, the cylindrical body 606 is retained inside the cylindrical body 600 but permitted to rotate with respect to the cylindrical body 600. In this manner, air leaving the air director 504 can be directed widely across the interior of the operator station 100 in almost any direction the operator chooses. A flexible seal 612 shaped generally as a torus (but rectangular in cross-section) is disposed between the cover 400 and the headliner 500 to ensure that air flowing through each of the respective holes 404, 406, 408, 410, 412, and 414 cannot migrate into the void between the cover 400 and the headliner 500. The flexible seal 612 abuts the inner surface of the headliner 500 and the outer surface of the cover 400 to define a short, sealed air conduit between the holes in the cover 400 and the corresponding holes in the headliner 500. Repositionable guide vanes 614 extend across the end of the cylindrical body 606 to selectively close or open the lower end of the cylindrical body 606, thereby permitting the operator to open or close the air director 504.

The examples that are pictured and talked about in this document are provided to better show a few possible ways of making the invention. The invention, however, is not limited to the examples shown. The invention is anything that is described by the claims below.

The invention claimed is:

1. A roof for an operator station of a work vehicle, comprising:
a molded roof portion formed by rotational molding, the molded roof portion having a first surface that is generally planar and faces in a first direction, and a second surface molded integrally with the first surface, wherein the second surface faces in a second direction opposite the first direction, is concave and has a plurality of integrally molded troughs that extend upward into the second surface; and
a cover that is fixed to the second surface and encloses the plurality of integrally molded troughs, thereby forming a plurality of air conduits between the plurality of integrally molded troughs and the cover, wherein the plurality of air conduits define at least one air inlet configured to receive air from an air conditioning unit, and further define a plurality of air outlets configured to release air from the plurality of air conduits into the operator station and wherein the plurality of air outlets are formed as holes in the cover.

2. The roof of claim 1, wherein the at least one air inlet is formed as an aperture in the cover.

3. The roof of claim 1, wherein the plurality of integrally molded troughs are formed as a central trough from which several branching troughs extend.

4. The roof of claim 3, wherein the branching troughs both extend forward from the central trough, and fan out laterally along a majority of their lengths extending from the central trough.

5. The roof of claim 3, wherein the branching troughs narrow in a horizontal direction as they extend forward from the central trough.

6. The roof of claim 3, wherein the central trough has a major dimension extending parallel to a fore-aft centerline of the roof.

7. The roof of claim 3, wherein the several branching troughs comprise a first plurality of branching troughs extending from the central trough on a first side of the central trough and a second plurality of branching troughs extending from the central trough on a second side of the central trough.

8. The roof of claim 3, wherein the branching troughs comprise a first plurality of branching troughs extending into close proximity with opposite transverse sides of the roof and a second plurality of branching troughs extending into close proximity with a front of the roof.

9. The roof of claim 3, wherein the central trough has a major dimension extending along a first axis and wherein the several branching troughs extend along second axes oblique to the first axis.

10. The roof of claim 3, wherein the holes in the cover forming the plurality of air outlets extend through portions of the cover opposite to terminal ends of the several branching troughs of the molded roof portion.

11. The roof of claim 3, wherein the cover comprises a plurality of individual cover portions fixed in overlapping fashion to the troughs.

12. The roof of claim 11, wherein the plurality of individual cover portions comprises a primary cover portion overlapping and enclosing the central trough and a plurality of secondary cover portions overlapping and enclosing the several branching troughs.

13. The roof of claim 1, wherein each of the plurality of integrally molded troughs comprises a floor, and two sidewalls integrally molded with the floor, and further wherein the two sidewalls flare outward from each other as they extend away from the floor.

14. The roof of claim 1, further comprising a headliner fixed to the molded roof portion, wherein said headliner encloses the cover between the molded roof portion and the headliner.

15. The roof of claim 1, wherein the holes in the cover forming the plurality of air outlets comprise holes in portions of the cover having surfaces facing away from the molded roof portion and angled so as to face towards a center of the cover.

16. The roof of claim 1, wherein the cover underlies the molded roof portion with the plurality of integrally molded troughs facing downwardly towards the cover.

17. A roof for an operator station of a work vehicle, comprising:
a molded roof portion formed by rotational molding, the molded roof portion having a first surface that is generally planar and faces in a first direction, and a second surface molded integrally with the first surface, wherein the second surface faces in a second direction opposite the first direction, is concave and has a plurality of integrally molded troughs that extend upward into the second surface; and
a cover that is fixed to the second surface and encloses the plurality of integrally molded troughs, thereby forming a plurality of air conduits between the plurality of integrally molded troughs and the cover, wherein the plurality of air conduits define at least one air inlet configured to receive air from an air conditioning unit, and further define a plurality of air outlets configured to release air from the plurality of air conduits into the operator station and wherein the at least one air inlet is formed as an aperture in the cover.

18. A roof for an operator station of a work vehicle, comprising:
a molded roof portion formed by rotational molding, the molded roof portion having a first surface that is generally planar and faces in a first direction, and a second surface molded integrally with the first surface, wherein the second surface faces in a second direction opposite the first direction, is concave forming a first upwardly extending cavity and has a plurality of integrally molded troughs that extend upward into a ceiling of the first upwardly extending cavity formed by the second surface;
a cover that is fixed to the second surface and encloses the plurality of integrally molded troughs, thereby forming a plurality of air conduits between the plurality of integrally molded troughs and the cover, wherein the cover forms a second upwardly extending cavity at least partially nested within the first upwardly extending cavity of the molded roof portion; and
a headliner fixed to the molded roof portion, wherein said headliner encloses the cover between the molded roof portion and the headliner.

19. An operator station for a work vehicle, the operator station comprising:
an air-conditioning unit;
a floor;
an operator seat;
a roof;
at least one window between the roof and the floor, wherein the roof comprises:

a molded roof portion comprising a first upwardly extending cavity and a plurality of integrally molded troughs extending into a ceiling of the cavity and facing the floor; and a cover coupled to and underlying the molded roof portion, the cover enclosing the plurality of integrally molded troughs to form a plurality of air conduits between the plurality of integrally molded troughs and the cover, the plurality of air conduits to receive air from the air-conditioning unit, the cover comprising a second upwardly extending cavity at least partially nested within the first upwardly extending cavity.

20. The operator station of claim 19 further comprising a vertical conduit extending to a transverse center of a rear of the roof and connected to the plurality of air conduits to supply air to the plurality of air conduits from the air-conditioning unit.

\* \* \* \* \*